G. R. SMITH.
BRAKE BLOCK.
APPLICATION FILED JULY 30, 1917.

1,276,430.

Patented Aug. 20, 1918.

Inventor
George R. Smith,
By Talbert & Parker
Attorneys

UNITED STATES PATENT OFFICE.

GEORGE R. SMITH, OF BAY CITY, MICHIGAN.

BRAKE-BLOCK.

1,276,430.  Specification of Letters Patent.  Patented Aug. 20, 1918.

Application filed July 30, 1917. Serial No. 183,560.

*To all whom it may concern:*

Be it known that I, GEORGE R. SMITH, a citizen of the United States, residing at Bay City, in the county of Bay and State of Michigan, have invented certain useful Improvements in Brake-Blocks, of which the following is a specification, reference being had therein to the accompanying drawing.

The present invention has reference generally to improvements in that class of inventions known as brakes and more particularly relates to a brake block.

It is the primary aim and object of this invention to provide a device of the above character designed for engagement with the wheel of an automobile or other vehicle so that when the same is employed, the vehicle will be prevented from accidental movement while it is being transported in a railroad car, etc.

It is an additional object of this invention to provide a brake block wherein the construction thereof permits of the adjusting of the same in order that it may be readily and quickly positioned in the wheel of the vehicle.

More particularly this invention embraces the provision of a device of the character mentioned constructed so as to be removably anchored on the floor of a railroad car or the like, and held in such position by the weight of the vehicle and thereby prevented from having accidental movement.

Among the other aims and objects of this invention may be recited the provision of a device of the character described with a view to compactness, and in which the number of parts are few, the construction simple, the cost of production low and the efficiency high.

Other improvements and novel details in the construction and arrangement of the various parts of the apparatus will be brought out more in detail in the description to follow, which for a clear understanding of the invention should be considered in connection with the accompanying drawings forming a part hereof, and wherein is disclosed for the purpose of illustration a convenient and satisfactory embodiment of the invention. It is to be noted in this connection that minor changes in the construction and arrangement of parts may be made without departing from the principle of operation of the various parts.

The invention is clearly illustrated in the accompanying drawings, in which.

Similar characters of reference are employed in all the above described views, to indicate corresponding parts.

Figure 1:
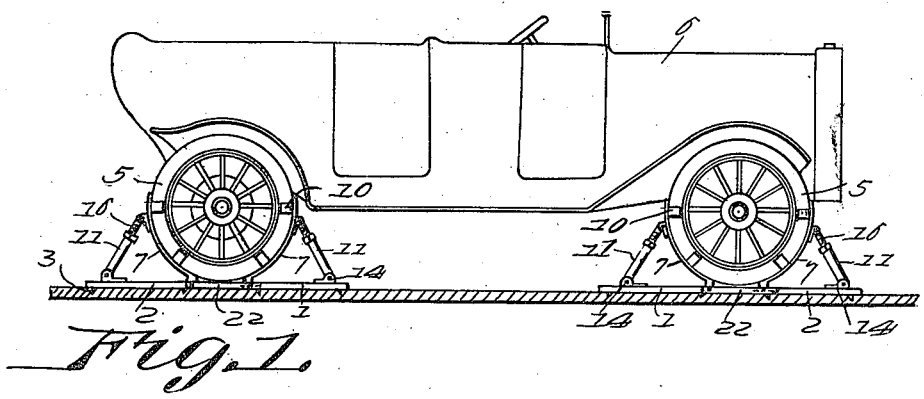
Figure 1 is a side elevation showing the device as applied to the wheels of a vehicle such as an automobile.
Figure 2:
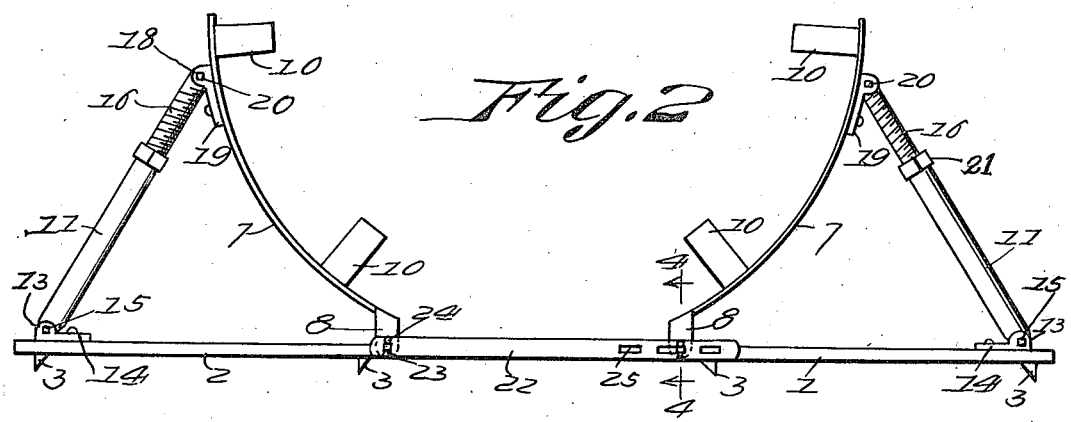
Fig. 2 is a side elevation of one of the improved brake blocks.
Figure 3:
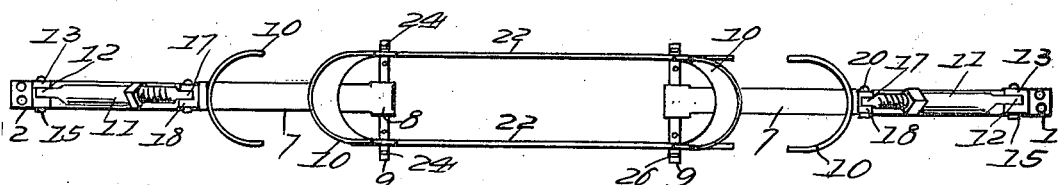
Fig. 3 is a top plan view thereof.
Figure 4:
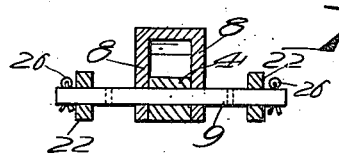
Fig. 4 is a transverse section taken on line 4—4 of Fig. 2.

Referring now, more particularly, to the accompanying drawings, there is provided a pair of base plates 1 and 2 each of which consists of a substantially rectangular body having suitable anti-skidding means on the under surface such as depending spurs 3. An ear 4 is formed on the adjacent inner end of each plate 1 on the upper surface thereof for a purpose that will presently appear.

With a view toward providing the improved means for engagement with the opposite lower surfaces of each of the wheels 5 of a vehicle 6 arcuate wheel receiving members 7 are employed; from the opposite sides adjacent the inner ends depend ears 8 which are engaged by a pivot pin 9, the latter being also engaged in the adjacent ear 4 of the adjacent plate whereby to pivotally connect the members 7 to the plate. Yokes 10 are formed on the upper surface of each of the members 7 for engagement with the sides of the wheel so as to prevent transverse movement thereof.

As intimated, improved means have been provided for adjustably supporting the wheel receiving members on the plates. In reducing this feature of the invention to practice a tubular rod 11 terminates at its lower end in an ear 12 which is pivotally connected between opposed ears 13 formed on the end of a hinge leaf or bracket 14 carried by the upper surface of the plate adjacent the outer end, through the instrumentality of a suitable nut and bolt arrangement 15. An exteriorly threaded rod 16 is now employed and terminates at one end in an ear 17 which is pivoted between ears 18 of the hinge leaf 19 carried upon the rear surface of the adjacent members 7, through the medium of a suitable nut and bolt arrangement 20. An adjusting element such as a nut 21 is adjustably mounted on each exteriorly threaded rod 16 and is designed for abutting engagement with the outer edge of the adjacent tubular rod 11 when the threaded rod is telescoped within said tubular rod. It is to be observed that this arrangement permits of the adjusting of each of the members 7 with respect to the adjacent base plates 1 and at the same time permits of the arranging of the members 7 in close relation with the opposite lower surface of one of the vehicle wheels 5.

Coöperating with the base plates 1 and 2 in the wheel receiving members 7 is the improved means for adjustably connecting the plates, which in the present instance may be said to consist of a pair of links 22 each having a single opening 23 adjacent one end for disposition about the adjacent squared projecting end of one of the pins 9 while a suitable retaining pin 24 of a cotter type extends transversely through the adjacent squared end for retaining the corresponding link against displacement. The opposite end of each link is provided with a series of rectangular slots 25 any one of which is designed for engagement with the adjacent projecting and flattened end of the other pivot pin 9 for holding the plates in a relatively adjusted position. Cotter pins 26 are also employed for removably retaining the links against accidental displacement. In this connection it is to be observed that the links are positioned upon opposite sides and are suitably spaced so as not to be engaged by the tire of one of the wheels 5 when positioned between the members.

In use it is first necessary to arrange the base plates 1 and 2 on the floor by means of suitable supports in the front and rear of each of the wheels thereof, the spurs 3 being designed to be anchored in the floor while the yokes 10 and the members 7 receive the wheel 5. Of course the nuts 21 may be adjusted to assure of the proper relation between the wheel receiving member 7 and the adjacent wheel 5, but finally the links 22 which are connected to one of the base plates are now adjustably connected to the other base plate to assure of the proper positioning and tensioning of the base plate.

As many changes could be made in the above construction and many apparently widely different embodiments could be made without departing from the scope of the invention, it is intended that all matter contained in the above description or shown in the accompanying drawings shall be interpreted as illustrative and not in a limited sense. It is also to be understood that the language used in the following claims is intended to cover all the generic and specific features of the invention herein described and all statements of the scope of the invention which, as a matter of language might be said to fall therebetween.

Having thus fully described this invention, what is claimed as new and desired to be secured by Letters-Patent, is:—

1. A brake block including a pair of base plates, arcuate wheel receiving members, pins for pivotally connecting the wheel receiving members to the base plates, means for adjustably supporting the wheel receiving members with respect to the base plates, and links adjustably engaged on the pins for holding the plates in a relatively adjusted position.

2. In a brake block, a base plate, a pair of ears formed on the upper surface thereof near the rear end, a pintle arranged through the forward end of the plate, an arcuate wheel receiving member, a pair of ears depending from the lower end of the member and pivotally arranged about the pintle, yokes carried by the wheel receiving member, another pair of ears carried by the rear surface of the member near the upper edge thereof, a tubular rod pivotally mounted between the ears on the base plate, a threaded rod pivotally mounted between the ears on the rear surface of the member and a nut adjustably engaged on the threaded rod and arranged in abutting relation with the outer edge of the tubular rod for holding the member in an adjusted position with respect to the plate.

In testimony whereof I affix my signature.

GEORGE R. SMITH.